Figure 1:
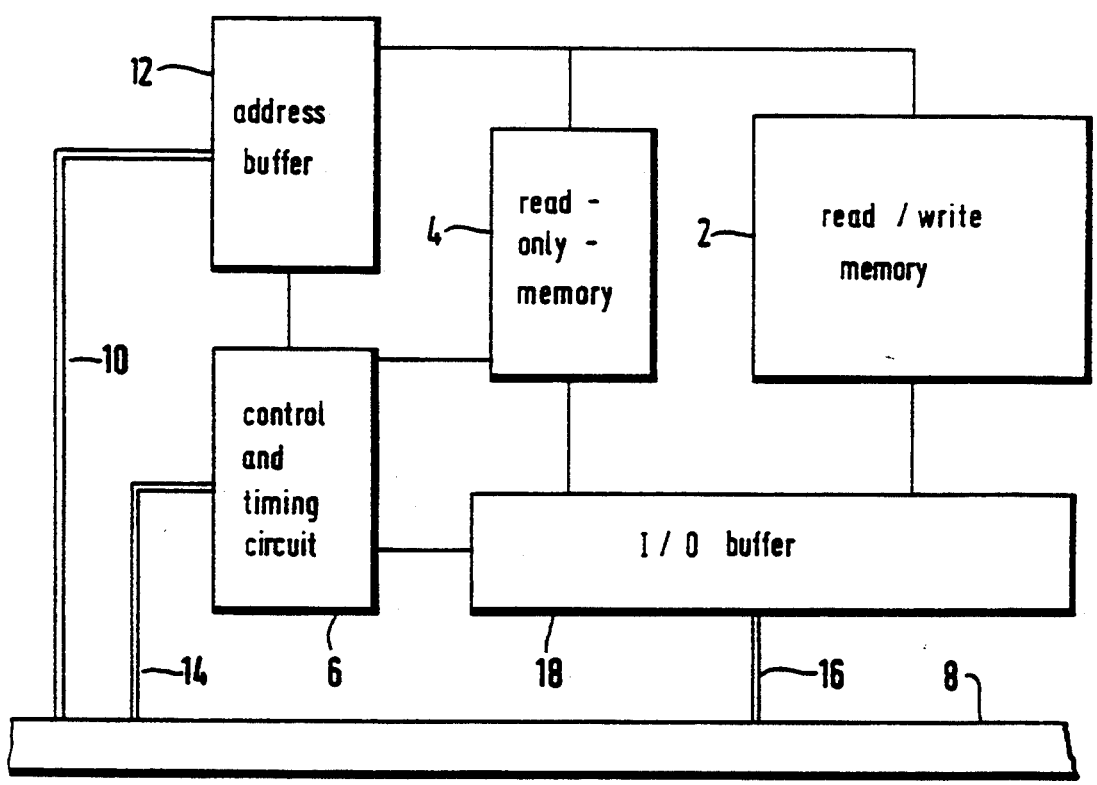

United States Patent [19]
Walters

[11] Patent Number: 5,357,573
[45] Date of Patent: Oct. 18, 1994

[54] MEMORY CARD

[75] Inventor: Kenn D. Walters, Vaterstetten, Fed. Rep. of Germany

[73] Assignee: Intelligent Solution Services GmbH, Marzling, Fed. Rep. of Germany

[21] Appl. No.: 928,006

[22] Filed: Aug. 12, 1992

[30] Foreign Application Priority Data

Aug. 12, 1991 [DE] Fed. Rep. of Germany ....... 9109977

[51] Int. Cl.⁵ .......................... H04K 1/00; H04L 9/00
[52] U.S. Cl. ..................................... 380/25; 364/184; 364/953.3; 380/4
[58] Field of Search ................. 364/184, 953.3; 380/3, 380/4, 25

[56] References Cited

U.S. PATENT DOCUMENTS

| | | | |
|---|---|---|---|
| 3,609,697 | 9/1971 | Blevins et al. | 340/172.5 |
| 4,907,272 | 3/1990 | Hazard et al. | 380/23 |
| 4,910,774 | 3/1990 | Barakat | 380/23 |
| 4,985,920 | 1/1991 | Seki | 380/23 |
| 5,014,312 | 5/1991 | Lisimaque et al. | 380/25 |
| 5,056,009 | 10/1991 | Mizuta | 364/953.3 |
| 5,177,790 | 1/1993 | Hazard | 380/23 |

FOREIGN PATENT DOCUMENTS

3809028 9/1988 Fed. Rep. of Germany .
4004740 8/1990 Fed. Rep. of Germany .
63-223850 9/1988 Japan .

OTHER PUBLICATIONS

Lippert, P., "Alles auf einer Karte", C'T, No. 4, pp. 308–312 (1991).
Kontur, et al., "Locking Up System Security", *Electronics Week*, Vol. 58, No. 7, pp. 68–72 (1985).
Ruoff, C. E., "Method of Manufacturing a Security Device", *IBM Technical Disclosure Bulletin*, vol. 22, No. 2, pp. 624–626 (Jul. 1979).
Struif, B., "The Use of Chipcards for Electronic Signature and Encryption", *Proc. V.L.S.I. and Computer Peripherals*, 12, pp. 4-155–158 (May 1989).

Primary Examiner—Stephen C. Buczinski
Attorney, Agent, or Firm—Fitzpatrick, Cella, Harper & Scinto

[57] ABSTRACT

Memory card as mass memory device for computer systems preventing unauthorized use of software stored on said memory card. In the memory card a non-changable and read-only protection code is stored indicative of the respective memory card and/or the computer system and/or the manufacturer of the software etc. A protection routine is added to the software program to be protected executing the protected software itself only if a comparison code within the protection routine matches with the non-changeable protection code.

10 Claims, 5 Drawing Sheets

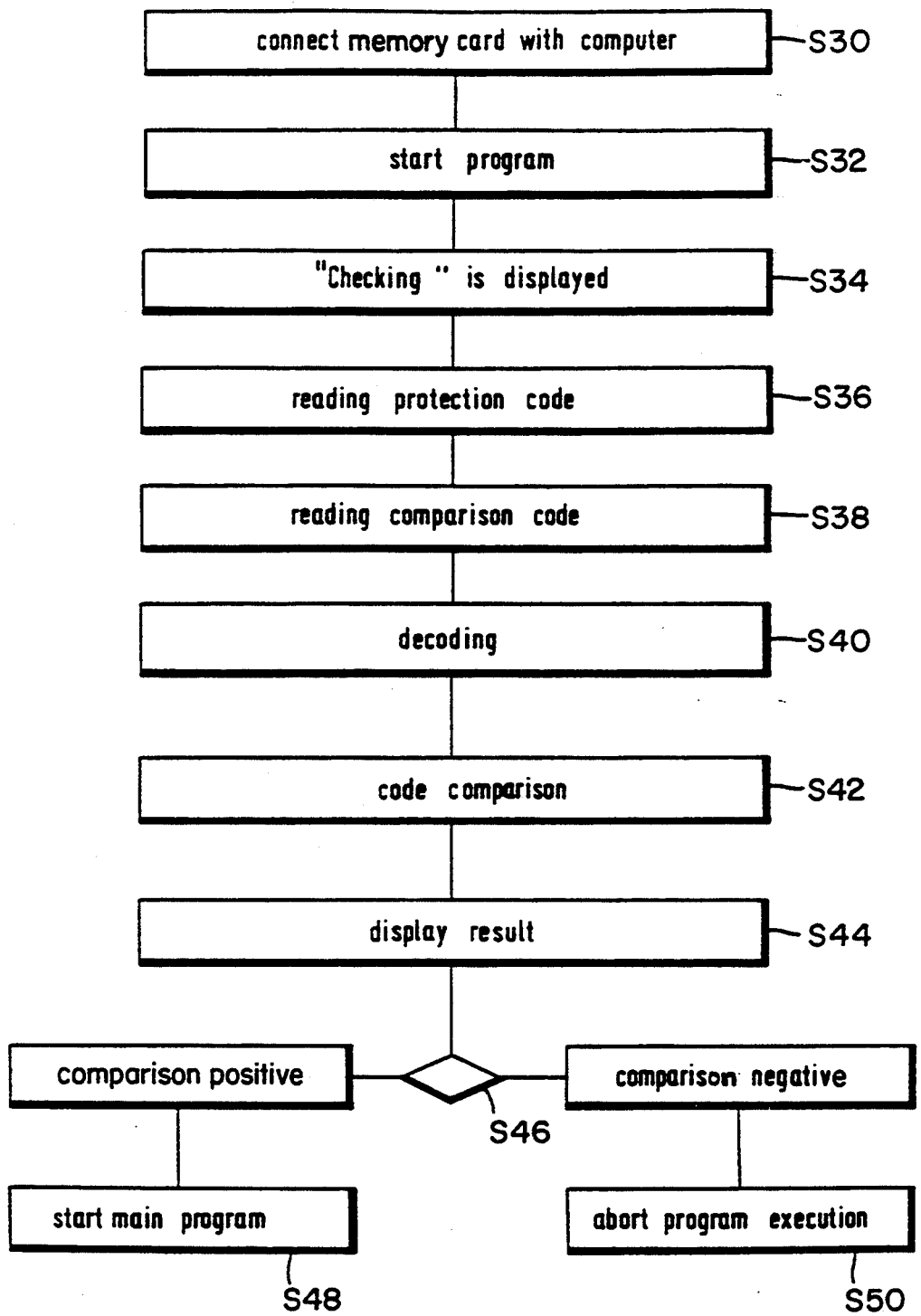

MEMORY CARD

DESCRIPTION

The present invention generally relates to protection of software stored on so called memory cards against unauthorised use. Such memory cards are specifically used in laptop, notebook and palmtop computers as mass memory device replacing slow and power consuming diskette drives and hard disks. In particular the invention relates to memory cards of this type preventing unauthorized use of software stored thereon. The invention further relates to a method of producing such a memory card and to a method of preventing unauthorized use of software employing such memory cards.

The memory cards, which in the meantime have been standardised through JEIDA (Japanese Electronic Industry Development Association) and PCMCIA (Personal Memory Card International Association), are distinguishable from diskettes and hard disks by their size, robustness and higher processing speeds. Memory cards conforming to the PCMCIA standard, upon which the World's leading hardware and software manufacturers have agreed, offer the possibility of using different semi-conductor technologies. The mean access time for this type of memory card with an SRAM chip lies between 100 ns and 200 ns as opposed to floppy disk drives which require several hundred micro seconds.

As these memory cards were developed as replacements for diskettes and hard disks they draw specific attention to a disadvantage of these systems, namely protection against unauthorised copying. Considering the enormous amount of damages incurred by the computer industry which arise from unauthorised copying and software piracy it is understandable that efforts have been made to protect software and prevent unauthorised copying. In expert circles it is generally recognised that software cannot sufficiently protect software. Programs that are saved on the same memory medium as the protection program cannot offer complete protection, as this still allows bit by bit copying. Also, protection programs which are installed on a particular hardware basis in order to prevent specific application software from running on a machine of a different type, cannot protect against use on another machine of the same type. A solution to this problem on a personal computing level is the use of a so-called "dongle". A "dongle" is a connector containing an integrated electronic circuit which is normally fitted to the parallel port on the PC. The electronic circuit contains a code which electronically cannot be altered or copied. This code is then read by a special authorisation routine in the protected application program when this program is loaded. The application will not run unless the code is found.

For "palmtop" or notebook PCs this is normally not a practical protection for the software, because "Dongles" are generally too large and too expensive for this type of PC. Additionally this type of PC frequently does not have a standard parallel port. (e.g. HP95LX does not have a parallel port at all.)

It is an object of the present invention is to provide a memory card for PCs which protects against unauthorised copying of data and programs saved on the memory card and which also prevents unauthorised use of such data and programs. It is a further object of this invention to provide a method for the production of such memory cards. It is still a further object of the present invention to provide a method for protection of software against unauthorised use.

In accordance with the present invention a mass memory card for computer systems is provided which contains read/write memory means for data and programs, control means for controlling the memory means and interface means for the connection to a computer system. By means of a non-changeable and read-only protection code contained or stored in the memory card a reliable protection against unauthorised use of programs and data stored in the memory card is guaranteed. The software or application program which is to be protected is supplemented by a protection routine which is activated by calling the application program. The protection routine reads the protection code from the memory card and compares it to a comparison code Contained within the protection routine. Only if these two codes match, will the protection routine allow the protected application program to start. If the codes do not match, the process will be terminated and a corresponding error message appear on the screen. As such the comparison code can be saved as an integral part of the protection routine or, alternatively, in the read/write memory means.

Software protected in this way can still be copied to diskette or hard disk, but such a copy is no longer executable. An attempt to execute the protected program will lead the protection code from the read-only area of the memory means to be read and hence an error message will appear as the diskette or hard disk does not contain a corresponding read-only memory area. Also if the protected program is copied to another memory card, it is not executable, as the comparison code contained within the protection routine does not concur with the protection code on the new memory card.

According to a preferred embodiment of the invention the protection code is stored on a separate, specifically assigned, read-only chip, which cannot be directly accessed. The protection code can only be read from this separate chip by means of the special protection routine. As such a reliable method is provided for preventing the alteration or manipulation of the protection code in a standardised hardware environment. It is particularly advantageous that FORMAT and COPY commands do not need to be altered in order to prevent access to protection code in the read-only chip.

In a further preferred embodiment of the invention the memory card corresponds to the PCMCIA standard for memory cards. This standard and corresponding specification is currently at release 2.0 level (August 1991). Insofar that the memory cards in accordance with this invention correspond to this standard the universal application of this invention is guaranteed.

In a further preferred embodiment of the invention, the different codes used are encrypted. Decoding of said codes is only possible be means of the protection routine contained within the application software that is to be protected.

The protection code contains, as options, a card identification code, a computer system identification code and/or a memory card manufacturer identification code. For example, should one need to guarantee that particular application software is only used in combination with the memory card, it will suffice, if the protection code includes a memory card identification code. The program to be protected contains a special protection routine, which accesses the protection code and only executes the application program if the protection code is read correctly, i.e. when an authorised memory card is used. If, on the other hand, the protection code contains a PC identification code, on which the program should be executable, the execution of the program can be limited to a specific PC. Alternatively, a user identification code can be provided for, should a particular application program be authorised for a specific user independent of the number of copies or type of computer system it will run on.

By providing a generally available memory card of the afore described type with a memory chip, writing into said memory chip the protection code and finally physically breaking off the write pin to the memory chip containing the protection code a memory card in accordance with the invention is made available relatively cheaply. By physically breaking off the 10 write pin to the memory chip containing the protection code software manipulation of the protection code is reliably prevented.

Additional details, aspects and benefits of this invention can be extracted from the following description and the corresponding drawings.

FIG. 1—a circuit diagram of an initial design of the memory card according to this invention.

Figure 2:
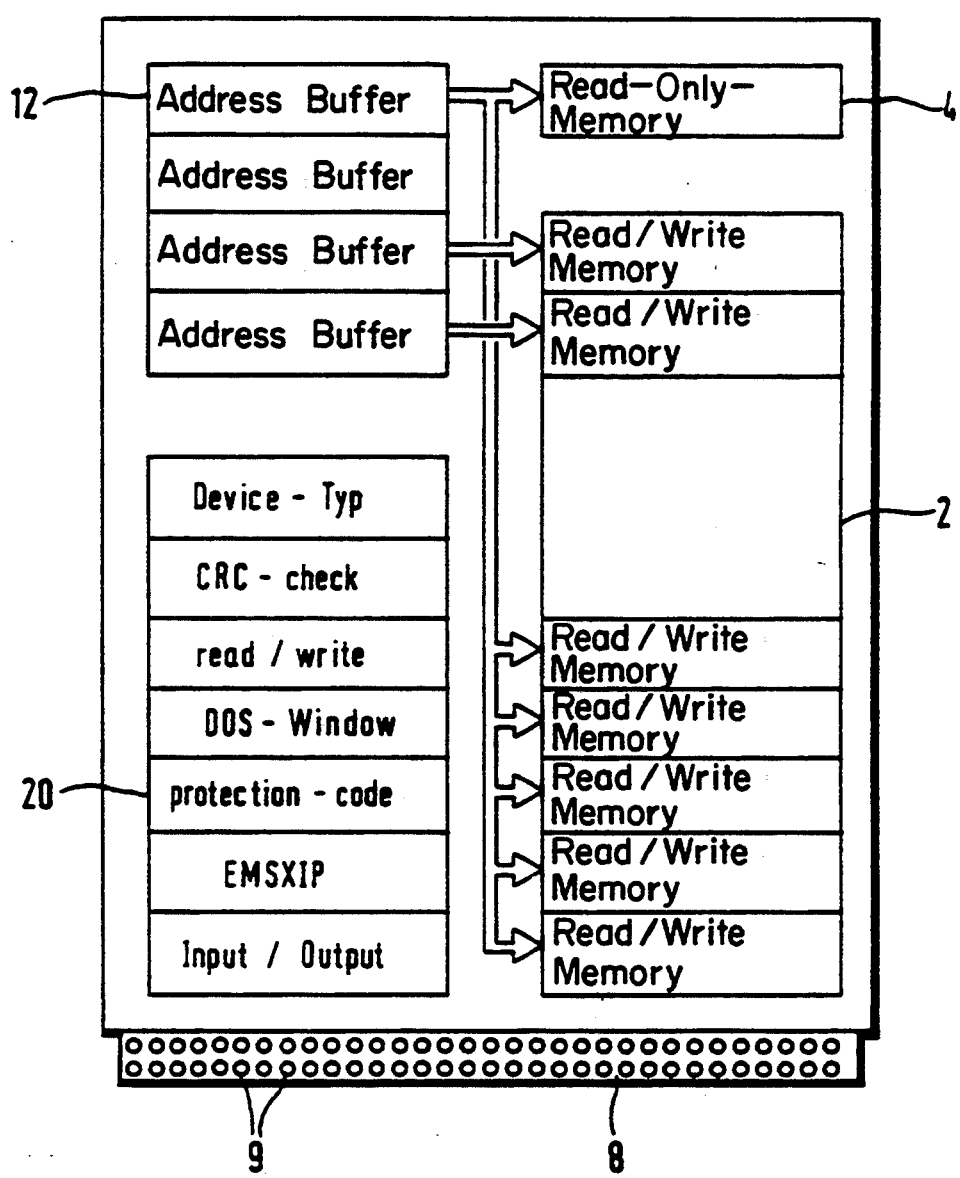

FIG. 2—a schematic representation of a second design of a memory card based on the PCMCIA standard and in accordance with this invention.

Figure 3:
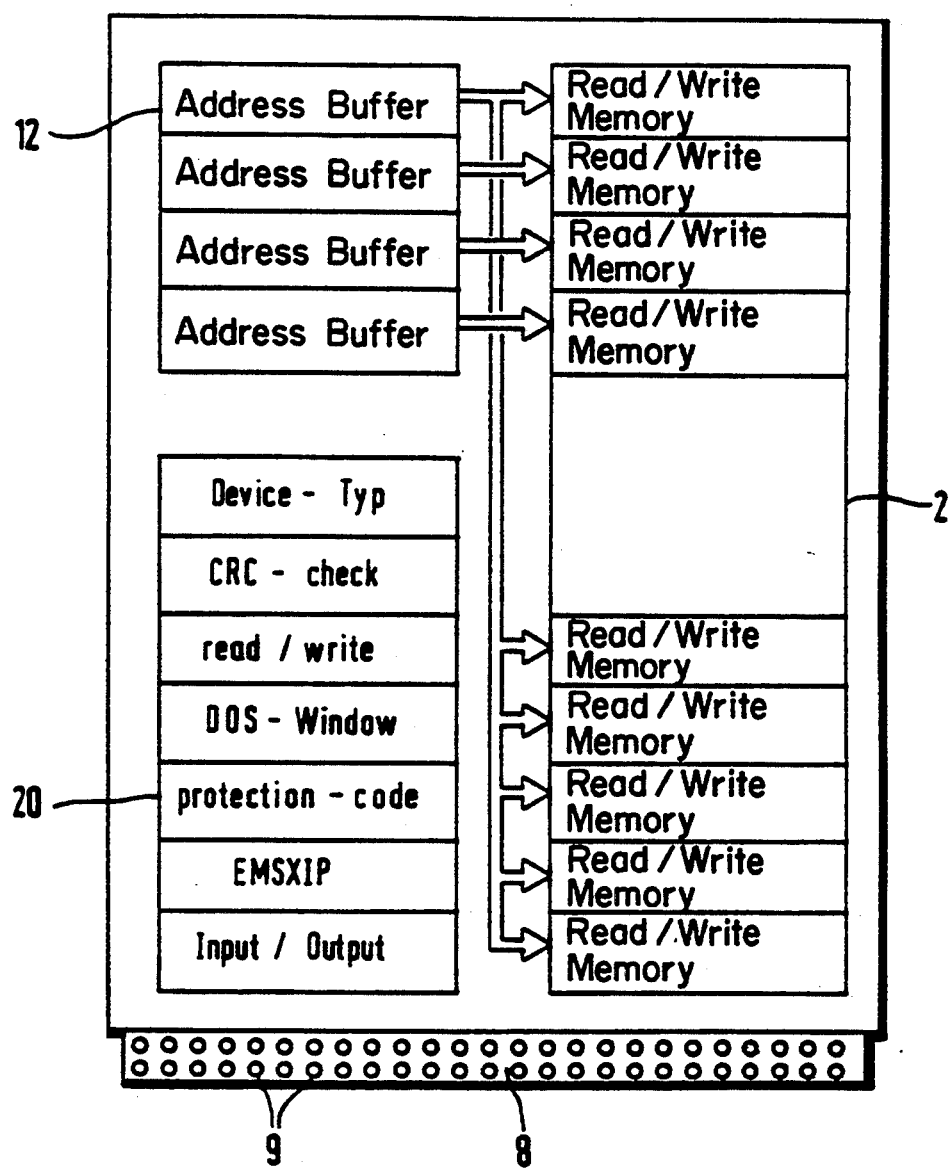

FIG. 3—a representation corresponding to FIG. 2 in a third design form of this invention.

Figure 4:
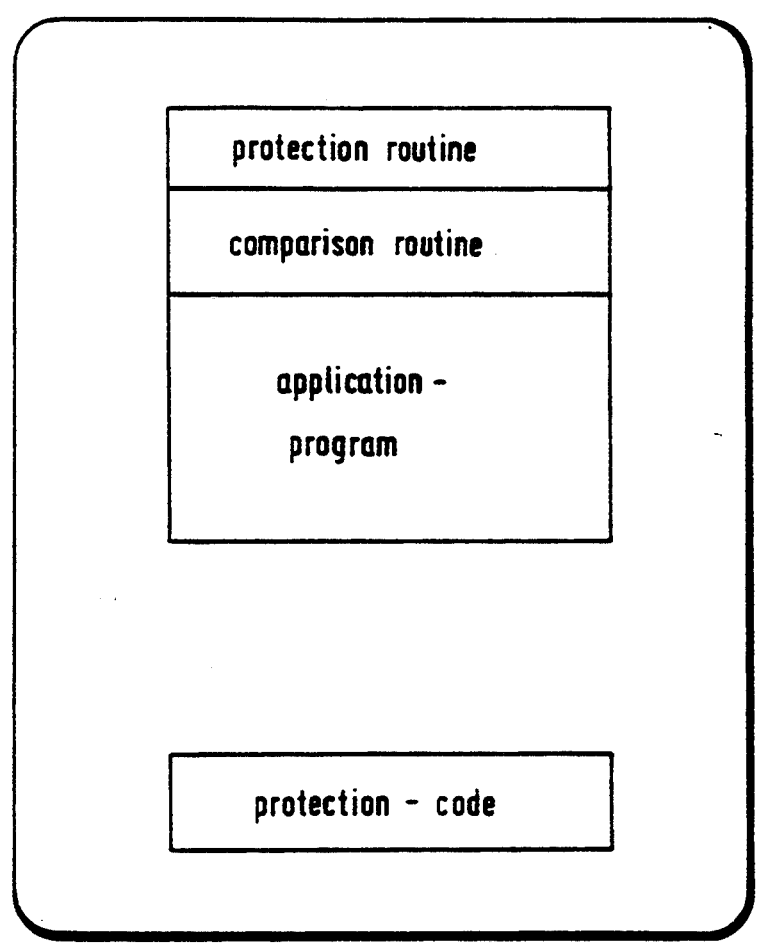

FIG. 4—a schematic representation of the contents of the memory of a memory card corresponding to this invention.

FIG. 5—a flow diagram explaining the procedure for the protection of software against unauthorised use in the context of this invention.

In the following description of preferred embodiments corresponding components are designated with the same reference numerals.

FIG. 1 shows a circuit diagram of a first embodiment of the memory card in accordance with the present invention. The memory card includes a Read-Write-Memory device 2, a read-only device 4, a control device 6 to control the memory devices 2 and 4, and an interface device 8 to connect the memory card to a computer system. The interface device 8 is connected via an address bus 10 with an address memory device 12 (address buffer). The interface device 8 is connected to the control device 6 via a control bus 14 and to an I/O memory buffer 18 via a databus 16. The read-write memory device 2 and the read-only memory device 4 are addressed via the address memory device 12. Data can be written to or read from the read-write memory device 2 via the databus 16 and the I/O memory buffer 18. The sequence of events on the memory card is controlled by signals supplied by the control bus of the control device 6.

The read-write device 2, the address memory device 12 and the I/O memory buffer 18 can be provided by SRAM or DRAM chips. In the read-only memory device 4 the protection code cannot be altered. The read-only memory device may be provided in the form of a ROM chip, an OTP chip (one time programmable), a FLASH-EPROM or an EEPROM. If the read-only memory device should take the form of an EEPROM or a FLASH chip, the write connector pins on the chip will be physically cut once the protection code has been written to the chip so that it is no longer possible to delete or change the protection code.

The control device 6 is laid out in such a way that direct access to the protection code on the read-only memory device 4 is not possible through the standardised hardware environment in which the memory cards are placed. Access to the protection code is only available via the special protection routine.

FIGS. 2 and 3 show preferred embodiments of the invention wherein the memory cards conform to PCMCIA and JEIDA standards. The current specification is at, PCMCIA release 2.0 from August 1991. This standard supports different memory structures and memory technologies. Simple memory cards contain only a generally accessible read-write memory in the form of semi-conductor memory elements with a control device. The supply to the memory card is provided by a standard 68 pin connector or interface. Complex memory cards conforming to the PCMCIA standard also contain attribute memory (CIS), which is divided into special memory segments. These segments contain information about the card, its memory technology, operating system specification etc. Due to the attribute memory it is also possible to use these type of memory cards for EMS memory expansion from which the so called XIP capability (Execute In Place) is derived. This means that programs stored on the memory card can be executed directly from the memory card and do not have to be first loaded from the main memory area of the computer system.

Details of the structure and design of the PCMCIA standard is available from the specification release 2.0 from August 1991.

A second embodiment of the invention is shown diagrammatically in FIG. 2. The memory card in FIG. 2 differs from a PCMCIA/JEIDA-standard memory card with attribute memory only insofar that an additional memory chip is provided on which the protection code is written. The interface device 8 is in the form of a 68 pin connector which accords to the PCMCIA standard. As, according to the current PCMCIA specification, not all 68 pins of the connector are used, it is possible to use some of the free pins as I/O connectors 9 for access to the read-only memory device 4. As these connector pins are not used in the PCMCIA specification, these may not readily be accessed in a standardised hardware environment that conforms to the PCMCIA specification. This guarantees that the protection code may only be accessed via the special program routine.

Alternatively, an additional read-only memory device in which the protection code is stored, may be added to PCMCIA memory cards without attribute memory, so that they conform to this invention.

FIG. 3 shows a third embodiment of the invention. This concerns a PCMCIA standard memory card with attribute memory in which the protection code is not contained within a special read-only chip, but is stored in a specially reserved area of the attribute memory 20. In the reserved area we are dealing with uneven bytes of the attribute memory, as, according to the PCMCIA specification, the even bytes are occupied only.

The protection code described in the previously mentioned described embodiments is contained within 8 bytes, which describe its existence, type and design. A further 8 bytes serve as the trademark of the memory card manufacturer, 8 bytes for the identification of the memory card (serial no. etc.), 8 bytes for the identification of the computer system on which the software should be executable. 3×8 bytes are available for data of specific choice, which, in particular could be used for coding or encryption of the protection code. The protection code identification is used to show the existence of a protection code, its type and version. The manufacturer and memory card recognition serve as a clear identification of the memory card. The computer system recognition code can ensure that a protected program is only executable from a specific computer. The 3×8 bytes for encoding and decoding the entire protection code increase the security of procedure, or rather the reliability of the memory card. The encoding of the protection code on PCMCIA specification memory cards with attribute memory will not restrict the XIP capability of memory card. It is however possible to include a program routine in the BIOS of the specific PC which can read from the read-only memory device. This routine will initially attempt to write to this memory area. When this does not succeed the protection code will be read to guarantee that it is dealing with a functional protection code.

In the following descriptions reference will be drawn from the diagrams in FIGS. 4 and 5 which highlight the functions of the memory card and software protection method of this invention. A protected application program is stored in the read-write memory device 2 of a memory card according to this invention. In addition, a protection routine and a comparison code that is assigned to the application program is also stored within the read-write memory device 2. In the read-only memory device 4 or in a specially reserved area of the read-write memory device (embodiment of FIG. 3) the protection code is stored and is unchangeable. The protection code together with the comparison code are preferably encrypted.

In order to execute a specific application program stored on a memory card in accordance with the present invention, the card will be placed in the PC (or the computer system) (step 530). Next, the specific application program will be called and started (step 532). A message will then appear on the display stating that the authorisation for using the software program is being checked (step 534). The protection code will be read, followed by the comparison code (steps 536 and 538). Thereafter both Codes will be decoded (step 540).

The decoded comparison code will then be compared to the decoded protection code (step 542). The result of the .comparison will be shown on the display (step 544). In step 546, should the comparison code and protection code agree the main program will start (step 548). If not, the program will abort (step 550).

What is claimed is:

1. A protected PCMCIA/JEIDA standard memory card for use as a mass memory device for computer systems such as palmtop, notebook and laptop computers, comprising a read-write memory means for storing data and application programs, a control means for controlling the read-write memory means, and an interface means for connecting the memory card to a computer system, wherein an unchangeable protection code is stored on a read-only memory means on the memory card.

2. A protected PCMCIA/JEIDA standard memory card for use as a mass memory device for computer systems such as palmtop, notebook and laptop computers, comprising a read-write memory means for storing data and application programs, a control means for controlling the read-write memory means, and an interface means for connecting the memory card to a computer system, wherein an encrypted unchangeable protection code is stored on the memory card.

3. The memory card of claim 1, characterized in that the protection code contains a memory card identification code, a computer system identification code or a memory card manufacturer identification code.

4. The memory card of claim 1, characterized in that the memory means contain, individually or in combination, OTP, ROM, SRAM, DRAM, FLASH-EPROM, or EEPROM chips.

5. The memory card of claim 2, characterized in that the protection code contains a memory card identification code, a computer system identification code or a memory card manufacturer identification code.

6. The memory card of claim 2, characterized in that the memory means contain, individually or in combination OTP, ROM, SRAM, DRAM, FLASH-EPROM, or EEPROM chips.

7. Method for modifying a PCMCIA/JEIDA standard memory card so as to prevent unauthorized use, comprising the steps of:

providing a conventional PCMCIA/JEIDA memory card with a first read-write memory means for storing data and application programs, a second read-write memory means, a control device to control access to the first and second read-write memory means, and an interface device to connect the PCMCIA/JEIDA memory card to a computer system; and storing a protection code in the second read-write memory means via the interface means, wherein said first read-write and said second read-write memory means include data terminals, address terminals, write enable terminals, and read enable terminals, all being connected to said interface, and wherein the write enable terminal of the second memory means is physically cut through so as to disable write enable functions of the second memory means.

8. Method for protecting software against unauthorized use, comprising the steps of:

providing a PCMCIA/JEIDA memory card, said PCMCIA/JEIDA memory card including a read-write memory means for storing data, application programs, and a protection code which cannot be changed;

modifying an application program to be protected by adding a protection routine, which is activated by calling the application program and;

storing the modified application program on the memory card, wherein said protection routine includes the process steps of:
reading the protection code from the memory card;
comparing the protection code with a comparison code assigned to the application program;
aborting application program execution if the comparison code does not match the protection code;
starting the application program if the comparison code and the protection code match.

9. Method according to claim 8, characterized in that the protection code and the comparison code are encrypted.

10. An improved PCMCIA/JEIDA memory card for use as a mass memory device for computer systems, comprising:

a first read-write memory means for storing data and application programs;

a second read-write memory means;

a control device to control access to the memory devices; and an interface device to connect the PCMCIA/JEIDA memory card to a computer system, said interface device being connected to data terminals, address terminals, write enable terminals, and read enable terminals of said first and said second read-write memory means;

a protection code stored unchangeably in the second memory means; and an application program including a protection routine stored in said first read-write memory means, the protection routine including:

means for reading the protection code stored unchangeably in the second memory means;

means for comparing a comparison code with said protection code; and means for aborting program execution if said codes do not match, and for switching to execution of the protected application software if the codes match.

* * * * *